United States Patent Office 3,432,471
Patented Mar. 11, 1969

3,432,471
POLYOXYMETHYLENE-NORBORNYLENE COPOLYMERS
Calvin N. Wolf, Princeton, N.J., assignor to Ethyl Corporation, New York, N.Y., a corporation of Virginia
No Drawing. Continuation-in-part of applications Ser. No. 319,662, Oct. 29, 1963, and Ser. No. 428,245, Jan. 26, 1965. This application Apr. 25, 1967, Ser. No. 633,414
U.S. Cl. 260—67
Int. Cl. C08g 1/18
26 Claims

ABSTRACT OF THE DISCLOSURE

A composition of matter, as well as a process for preparing same, which comprises an interpolymer of a formaldehyde and norbornylene which latter has the formula

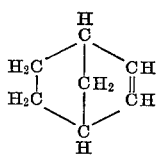

The amount of norbornylene in the interpolymer ranges from about 0.1–20 weight percent, based on the interpolymer. Molecular weights of the interpolymers range from 5,000 to about 200,000 and are suitable for molding, drawing fibers, and particularly for films. Melting points range from about 140°–190° C. The interpolymers may be thermally stabilized by end-capping them with a material selected from the group consisting of (1) an organic acid anhydride; (2) an etherification agent selected from the group consisting of orthoesters, vinyl ethers, and epoxides; and (3) an isocyanate selected from the group consisting of aliphatic and cyclic isocyanates.

Background of the invention

This application is a continuation-in-part of my now abandoned applications Ser. No. 319,662, filed Oct. 29, 1963, and Ser. No. 428,245, filed Jan. 26, 1965.

Field of the invention

This invention relates to novel and useful high molecular weight, high melting interpolymers composed principally of polyformaldehyde. This invention further relates to processes for producing these novel interpolymers.

Description of the prior art

It has been known in the past that formaldehyde was capable of being homopolymerized. Staudinger in "Die Hochmole-kularen Organischen Verbindungen" (1932), set forth such a process. However, the formaldehyde polymers obtained by this process aged in air at 105° C. such that the polymer degraded or "unzipped" into monomeric formaldehyde. MacDonald, in U.S. Patent 2,768,994, described a new polymerization process whereby high molecular weight formaldehyde homopolymers could be produced which were tougher and withstood higher temperatures than the low molecular weight polymers of the prior art. However, this polymer which exhibited excellent properties at low temperatures tended to degrade or "unzip" at temperatures at which the polymer had to be worked. Thus, in molding operations which require high temperatures it was found that polyformaldehyde would degrade, rendering the polymer relatively useless for applications requiring this operation.

Many methods have been attempted to satbilize the high molecular weight formaldehyde homopolymers. A typical method involves the compounding with the formaldehyde polymer of a stabilizer additive such as hydrazines (U.S. 2,810,708), phenols (U.S. 2,871,220), ureas, thioureas (U.S. 2,893,972), amines (U.S. 2,920,059 and 2,936,298), and benzophenones (Australian 230,163). These stabilizers are compounded into the polymer after the polymerization process. The stabilizers listed above seem to prevent, to some extent, oxidation and thermal deterioration. However, degradation is still experienced at high temperatures in the presence of air. Another method of stabilization included the essentially complete removal of the polymerization catalyst from the polymer since it was believed that the presence of a polymerization catalyst in the polymer caused degradation (U.S. Patent 2,989,509). Combinations of the foregoing methods have also been tried (Australian 229,481).

Elimination of the problem of thermal degradation has also been attempted by copolymerization of formaldehyde (trioxane) with cyclic ethers which are essentially homologous to monomeric formaldehyde (U.S. 2,989,509). Copolymerization of formaldehyde with alkylene carbonates as set forth in U.S. Patent 3,012,990 has also been achieved in an attempt to produce a thermally stable copolymer. However, under certain conditions these copolymers degrade in the presence of an acidic material. All of these methods have been successful to a certain extent, but none have cured all of the shortcomings such as degradation.

Early polymers of formaldehyde were of low molecular weight and thermally unstable. However, as early as 1932 polymers of formaldehyde were prepared with an improved thermal stability by "end-capping" the polymers (i.e. converting the terminal hydroxy groups of the polyoxymethylene into etherified or esterified terminal groups) by H. Staudinger ("Die Hochmolekularen Organischen Verbindungen," Berlin, Julius Springer, 1932, pp. 280–287). High molecular weight homopolymers of formaldehyde having improved thermal stability can be made by esterifying the polyoxymethylene glycol with a carboxylic acid anhydride in the presence of a tertiary amine according to U.S. Patent 2,998,409. British Patent 868,365 discloses the preparation of polyoxymethylene diethers by reacting a high molceular weight polyoxymethylene with a dialkyl acetal. British Patent 877,256 describes the preparation of polyoxymethylene ethers by reacting a high molecular weight polyoxymethylene with an orthoester, a ketal or an orthocarbonate. U.S. Patent 3,076,786 describes the preparation of formaldehyde-vinyl ether copolymers which can be acetylated with acetic anhydride to improve stability. End-capping of a trioxane-cyclic ether copolymer with isocyanates to enhance heat stability of the copolymer is disclosed in U.S. Patent 3,147,234.

It is therefore an object of the present invention to provide novel interpolymers which are stable to heat, and resistant to oxidative deterioration and caustic degradation.

It is a further object of the present invention to provide novel interpolymers which are tough, strong, flexible and elastic in nature.

It is still a further object of the present invention to provide novel interpolymers of formaldehyde and norbornylene which have beneficial qualities of the type outlined hereinabove.

It is another object of the present invention to provide a process for producing the novel interpolymers having thermal and oxidative stability and exhibiting properties of toughness, strength and resilience.

Other objects of this invention will be apparent from the ensuing description.

Summary of the invention

It has now been found that the above and other objects are accomplished by the provision of an interpolymer of a formaldehyde and norbornylene which latter has the formula

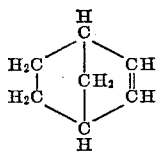

Generally, the amount of norbornylene which may be present in the interpolymers of this invention ranges from about 0.1 weight percent to about 20 weight percent, based on the interpolymer. The preferred amount of norbornylene ranges from about 0.5 to about 15 weight percent while the most particularly preferred amount ranges from about 1.0 to about 5 weight percent. Excellent polymers are obtained especially where the most particularly preferred percentage of norbornylene is employed, the copolymers exhibiting the characteristics of polyoxymethylene in that they are tough and resilient and resistant to thermal degradation.

In addition to the above, it has been discovered that the present interpolymers exhibit exceptionally good thermal stability when the terminal hydroxyl groups of the interpolymers are reacted with a material selected from the group consisting of: (x) an organic acid anhydride; (y) an etherification agent selected from the group consisting of orthoesters, vinyl ethers, and epoxides, and (z) an isocyanate selected from the group consisting of aliphatic and cyclic isocyanates.

Description of the preferred embodiments

Although it is not desired to be bound by theoretical considerations, it is believed that in the novel interpolymers of this invention, the norbornylene is bonded intermittently at random to the carbon atoms in the repeating formaldehyde molecule such as

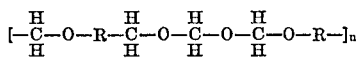

wherein R represents the norbornylene molecule.

A different formula which shows the probable theoretical molecular structure is

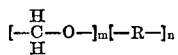

wherein $m$ is an integer representing the total number of polyoxymethylene groups in the polymer, and $n$ is a smaller integer representing the total number of norbornylene groups that are present and scattered throughout the polyoxymethylene structure.

The novel interpolymers of this invention have high molecular weights and high melting points. The molecular weights of these novel polymers generally range from about 5,000 to about 200,000. However, the preferred molecular weights range from about 10,000 to about 150,000 since the copolymers obtained in this range are more easily adapted for the ultimate end uses, i.e., molding, drawing fibers, and the like. The molecular weight ranges are a direct function of the inherent viscosity. Thus, inherent viscosities ranging from about 0.1 to about 5.0 are desirable in the polymers of this invention. The most preferred inherent viscosities range from about 0.5 to about 3.0 since polymers having these viscosities are within the preferred molecular weight range. The inherent viscosity is preferably measured at 0.2 percent by weight in para-chlorophenol containing 2 percent alpha-pinene at 60° C.

The melting point (polymer melt temperature) ranges of the novel interpolymers of this invention generally range from about 140° C. up to about 190° C. The most preferred melting point ranges for the polymers is from about 150° C. up to about 180° C., since polymers within this melting point range generally exhibit superior molding characteristics.

An important feature of the novel interpolymers of the present invention is the fact that prohibitive thermal degradation or "unzipping" effect is not experienced at the elevated temperatures required for molding operations. Coupled with this advantageous feature is the fact that these novel interpolymers exhibit properties of toughness, resilience, strength and flexibility. Still another important feature of interpolymers of this invention is their resistance of degradation in the presence of strong caustic solutions. Formaldehyde homopolymers in the past rapidly decomposed into monomeric formaldehyde upon being treated with a strongly alkaline solution. This disadvantage is not experienced to the same extent with the present interpolymers. Thus, disadvantages experienced in many of the prior art formaldehyde polymers have now been overcome, or at least, significantly minimized.

The term "interpolymers" as used in this invention may be further defined as polymers containing 2 or more monomers as above defined, in the polymer chain. Thus, copolymers, terpolymers, tetrapolymers, and the like, are all within the ambit of this invention.

A further embodiment of the present invention relates to a process for producing the novel norbornylene-formaldehyde interpolymers of this invention. The novel interpolymers of this invention are produced by polymerizing any reactive essentially anhydrous form of a formaldehyde with the norbornylene. This polymerization process is conducted in the presence of a catalyst, the nature of which largely depends upon the type of formaldehyde being used in the reaction. Thus, when trioxane is being copolymerized with norbornylene, generally an acidic catalyst is employed. Other catalysts such as a mixture of titanium tetrachloride and triethyl aluminum, are generally preferred when essentially anhydrous gaseous monomeric formaldehyde is being employed in the copolymerization reaction.

The "end-capped" polyacetal copolymers of the present invention have a thermal stability of a much higher degree than would be expected when compared to the stability increase obtained when a formaldehyde homopolymer is "end-capped." A further unexpected advantage obtained in the stabilized polyacetal copolymers of the present invention is the high yield of copolymer obtained after the "end-capping" treatment. It has been known that the thermal stability of a crude polyoxymethylene polymer could be increased by destroying the very unstable portion by treating the polymer with an alkaline material (see Belgian Patent 602,869). However, this treatment causes a severe loss in product yield and makes such a treatment undesirable for commercial production of a polyacetal resin. The process of the present invention produces a highly stable polyacetal copolymer in good yield from a crude reaction product.

One embodiment of the present invention provides a stable polyacetal copolymer by reacting the terminal hydroxyl groups of my polyoxymethylene copolymer with an organic acid anhydride. Suitable acylating agents are the anhydrides of saturated, monobasic aliphatic, araliphatic, cycloaliphatic and aromatic carboxylic acids having from 2 to 20 carbon atoms. The acid may be substituted by such groups as alkoxy or halogen. Examples of suitable anhydrides of aliphatic carboxylic acids are the anhydrides of acetic, propionic, butyric, caproic, decanoic, and stearic acids. Cyclohexyl carboxylic acid anhydride is a suitable cycloaliphatic anhydride. Among suitable aromatic acid anhydrides may be mentioned phenyl acetic and benzoic acid anhydrides. Mixtures of the anhydrides may also be used as an acylating agent. The preferred anhydride for use in the present invention is acetic anhydride because of its low cost and ready availability. Additionally, this anhydride is one of the most reactive of the suitable anhydrides.

The novel process of the present invention can be conducted in batch or continuous processes utilizing a wide variety of polymerization techniques, i.e., bulk polymerization, solution polymerization, suspension polymerization, solid state polymerization, vapor polymerization, and like procedures.

Bulk polymerization is achieved by mixing a formaldehyde compound such as trioxane with a catalyst and the norbornylene. Thereafter the reaction mixture is maintained at a desired temperature such as between about 50° C. to about 90° C. for bulk polymerization, or lower for solid state polymerization for a period of time sufficient to copolymerize the reaction mixture. The reaction time generally varies from a matter of seconds up to one or more days, a period ranging from about 3 minutes to about 12 hours usually being sufficient. The resultant polymer obtained may then be ground up and molded, or previous to molding, subjected to various purification, and/or subjected to other stabilization procedures, compounded with stabilizers or the like.

Solution polymerization generally comprises contacting a formaldehyde source such as trioxane with a catalyst and norbornylene in an inert solvent such as a liquid hydrocarbon at a temperature ranging from about —90° C. up to about 200° C. The reaction is generally conducted at a pressure ranging from about atmospheric up to about 20 atmospheres. The reaction is stirred and for a time sufficient to obtain the desired copolymer of the desired molecular weight after which the product is then extracted and allowed to dry. Again, subsequent treatments used in the art for improving the properties of polyformaldehyde may be used, if desired.

The inert solvents which may be employed in the solution polymerization process are any solvents which are inert to the reactants. Thus, liquid hydrocarbons (paraffins, cycloparaffins, aromatics, or mixtures of these), glycol ethers, inert monoethers (dialkyl ethers, dicycloalkyl ethers, diaryl ethers, diaralkyl ethers, or mixed ethers in which the organic groups are taken from different classes—viz, alkyl, clcyoalkyl, aryl and aralkyl groups) saturated halohydrocarbons, and the like may be employed. Typical of these solvents are hydrocarbons such as hexane, heptane, octane, cyclohexane, methylcyclohexane, benzene, nitrobenzene, nitromethane, toluene, xylene, petroleum distillates, such as naphtha, kerosene, and gasoline, halogenated hydrocarbon compounds such as chlorobenzene carbon tetrachloride, ethylene dibromide, methylene chloride, cis-1-2-dichloroethylene, 1,2-dichloroethane, glycol ethers such as the dimethyl ethers of diethylene glycol, the diethyl ether of diethylene glycol, monoethers such as diethyl ether, dibutyl ether, dicyclohexyl ether, dibenzyl ether, diphenyl ether, methyl phenyl ether; di-isobutyl ketone, benzaldehyde, acetonitrile, tetrahydronaphthalene, decahydronaphthalene, and the like.

Vapor polymerization comprises contacting in a reaction zone the vapors of formaldehyde and norbornylene in the presence of a catalyst at temperatures ranging from about —20 to about 200° C. The pressure at which the vapor polymerization process can be conducted generally ranges from about atmospheric up to 200 atmospheres. The polymer may then be withdrawn as it is formed in the reaction chamber. Thereupon optional work-up and/or stabilization procedures may be utilized.

The processes as outlined above are capable of being adapted to a continuous process, a batch process or semibatch operation; for example, where vapor polymerization reaction is being conducted it may readily be converted to a continuous process by merely adding the reactants and catalysts to the reaction zone while recovering the interpolymer as soon as it is formed. An excellent example of a batchwise process is the bulk polymerization of a formaldehyde such as trioxane with norbornylene after which the desired polymer may then be recovered.

Generally it is preferred to employ an essentially anhydrous inert atmosphere over the reaction mass particularly when bulk polymerization techniques are being employed. However, an inert atmosphere may be employed in other polymerization processes such as the solution polymerization and vapor polymerization. Typical of the inert gases which may be employed are carbon monoxide, nitrogen, argon, krypton, neon, helium and the like. Certain saturated paraffinic hydrocarbons may also be employed as the inert atmosphere where the hydrocarbons are inert to the reaction mass. Examples of paraffinic hydrocarbons which may be employed are methane, ethane, propane, and the like.

The formaldehyde employed, as stated hereinabove, can be any reactive form of formaldehyde in the essentially anhydrous state. Monomeric formaldehyde and trioxane are the best known reactive anhydrous forms which may be used. Monomeric formaldehyde can be produced by any of the general prior art methods such as is set forth by Walker in "Formaldehyde," A.C.S. Monograph Series No. 98 (1944). Typical methods employed to obtain monomeric formaldehyde are by pyrolyzing paraformaldehyde, polyoxymethylene, or others forms of formaldehyde. However, it is preferred in this invention to employ trioxane since it is easier to handle, especially in bulk or solution polymerization processes. On the other hand, in vapor polymerization processes it is more desirable to employ monomeric formaldehyde which is essentially anhydrous since this compound is more easily vaporized.

Typical of the Lewis acids which are employed as catalysts in the trioxane copolymerization process of this invention are the inorganic halides, particularly the inorganic fluorides, inorganic fluorides complexed with ethers and amines, metal alkoxides, sulfonyl halides, metalloidal halides, hydrogen halides, and the like. The most preferred Lewis acid catalysts are boron trifluoride, boron trifluoride etherate complexes, boron trifluoride amine complexes, $FeCl_3$-propylene oxide complexes, $SbF_3$, $SnCl_4$, $PF_5$, HF, antimony fluoroborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, fluorosulfonic acid since excellent results are achieved in bulk and solution polymerization processes employing trioxane as the formaldehyde reactant.

Typical of the catalysts which may be employed in the process of this invention when utilizing gaseous monomeric formaldehyde as the formaldehyde monomer are the organo phosphines, organo stibines, organo arsines, primary amines, secondary amines, tertiary amines, the alkali and alkaline earth hydroxides, oxides and peroxides, and the like.

A preferred catalyst is known as a Ziegler type catalyst such as a mixture of titanium tetrachloride and trialkyl aluminum.

Other catalysts which may be employed in association with gaseous monomeric formaldehyde and norbornylene in the present polymerization process are onium salts, metals, metal alloys, metal carbonyls, as well as various oxides, peroxides, hydroxides of the heavy metals, and various aryl diazonium hexaphosphates such as 4-chlorophenyl hexafluorophosphate.

The types of heterogeneous catalysts may be broadly defined as metal oxides, mixed metal oxides, acid clays, acid treated clays, and ion exchange resins. Acid types of heterogeneous catalysts generally are used in the polymerization of trioxane while the basic catalysts are employed in the polymerization of monomeric formaldehyde. However, acid ion exchange resins may be employed in some instances in both the copolymerization of trioxane or monomeric formaldehyde and norbornylene.

Typical examples of the heterogeneous catalysts are silica-alumina, silica magnesia, silica zirconia, alumina boria, alumina magnesia, silica gel, Permutit S-2 (which is understood to be aluminum silicate), alumina chromia, Amberlite IR (which is understood to be a phenolic methylene sulfonic cation exchanger produced by the reaction of phenol, formaldehyde, and a sulfonic acid), montmorillonite, and the like.

The amount of catalyst which may be employed in the process of this invention is susceptible of variation. Generally, amounts ranging from about 0.0001 to about 5 percent by weight of the total reaction mass may be employed. However, the preferred amount of catalyst ranges from about 0.01 percent to about 2 percent by weight since within this range polymers having optimum properties such as strength, toughness and resilience are obtained. The amount of catalyst employed in the present invention, although not critical, forms an important element of the process. Thus, it is desirable to keep the catalyst concentration within the preferred range outlined above.

The temperature at which the polymerization process is conducted varies with the type of process employed. Thus, in bulk polymerization processes temperatures ranging between about 50° C. up to about 90° C. are employed. In the solution polymerization processes reaction temperatures may vary from about −90° C. up to about 200° C. whereas in vapor polymerization processes temperatures between about −20° C. up to about 200° C. are employed.

The combination of temperature and the amount of catalysts employed has a direct bearing on the molecular weight of the polymer which is produced via this invention. Thus, in general, high conversions of low molecular weight copolymers are obtained when high catalyst levels coupled with low polymerization temperatures are used. The same phenomenon occurs where a low catalyst concentration is employed coupled with high temperature. The preferred combination of temperature and amount of catalyst whereby a polymer having a high molecular weight or high inert viscosity is produced involves use of a low catalyst level and low polymerization temperature. Thus, in a bulk polymerization process, temperatures ranging between about 65° C. up to about 85° C., and catalyst concentrations varying from about 0.01 percent to about 2 percent (based on the total weight of monomers being used), are preferred in accordance with this invention. In the preferred solution polymerization process the temperature ranges from about 0° C. up to about 90° C., the catalyst concentration being the same as in the preferred bulk polymerization process.

The pressure employed in the polymerization processes of this invention depends generally on the type of formaldehyde and catalyst being used and on the type of process technique being utilized. Thus, in the solution polymerization and vapor polymerization procedures the pressure generally ranges from atmospheric up to about 20 atmospheres, and may be obtained at least in part by the addition of an inert gas.

The acylation of the polyoxymethylene copolymer may be carried out in a number of different ways. The copolymer may be reacted directly with the liquid acid anhydride serving as a suspending liquid. The copolymer may be suspended in an insert non-solvent for the polymer and the anhydride added to the suspension. Alternatively, the copolymer may be reacted with the anhydride by passing a stream of the acid anhydride in the gaseous state through a bed of particulate copolymer (U.S. Patent 3,125,551). Also, the copolymer and the acylating agent can be dissolved in a common inert solvent and the acetylation carried out in solution. Non-solvents suitable for use in the process of the present invention as suspending agents include paraffinic hydrocarbons such as hexane, heptane, octane, and isooctane; cycloparaffins such as cyclohexane; haloparaffins such as methylene dichloride, tetrachloroethylene, cis-1,2-dichloroethylene, and trans-1,2-dichloroethylene; ethers such as diethyl ether, dibutyl ether, chloromethyl ether, and dicyclohexyl ether. Materials suitable as common solvents for the copolymer and the acylating agent are N,N'-dimethylformamide, N-methyl-2-pyrrolidone, gamma-butyrolactone, N-methyl morpholine, and mixtures of the foregoing solvents. It is preferred to carry out the acylation by suspending the copolymer in the acylation agent. However, it may be carried out in a common solvent for both the acid anhydride and the copolymer.

The acylation of the copolymer may be carried out without the use of any catalyst. However, the reaction time is shortened and the degree of acylation of the copolymer is increased when a catalyst is used. Suitable catalysts are amines such as equinoline, pyridine, methylethylpyridine, triethylamine, and trimethylamine. Other catalysts are alkali metal salts such as sodium benzoate, sodium formate, potassium acetate, sodium acetate and disodium phosphate. Pyridine is a preferred catalyst since it can react with any acetic acid present in the acetic anhydride and also react with any formic acid produced by decomposition of the polyoxymethylene glycol copolymer chains.

The weight of solvent used should be from about 1 to about 40 times the weight of the copolymer to be acetylated. Preferably the weight of solvent used is from 1–10 times the weight of polymer treated.

The amount of acid anhydride used may vary over a wide range. When no solvent is used and the acid anhydride is used as a suspending medium for the copolymer up to 40 times the weight of the copolymer of the acid anhydride may be used. When the reaction is carried out in solution, the acid anhydride may be present in weights ranging from about one half the weight of copolymer treated to about 10 times the weight of copolymer treated.

The amount of catalyst used may vary from about 0.005 percent to about 75 percent of the weight of acid anhydride. When an alkali metal salt is used, it is preferably used in amounts between about 0.005 percent and about 10 percent of the weight of acid anhydride used. When an amine is used, it is preferably used in an amount from about 25 percent to about 60 percent of the weight of the acid anhydride.

The temperature of the acylation reaction is at least 50° C. and preferably from about 100° C. to about 200° C. A convenient temperature is often the reflux temperature at atmospheric pressure of the solvent or liquid anhydride being used. The reaction may be carried out at atmospheric pressure as above.

The reaction time may vary from a few minutes to as long as a week.

The acylated copolymer is filtered from the suspension media, or either cooled to room temperature or allowed to crystallize from a solvent and then filtered. The copolymer is washed several times with an organic liquid to remove the end-capping agent and catalyst and then dried for about 12 hours at 50° C., followed by vacuum drying at 40° to 60° C.

In another embodiment of the present invention a stable polyacetal copolymer is provided by reacting the terminal hydroxyl groups of my polyoxymethylene copolymer with an isocyanate. The isocyanate may be present in the form of a monomer or a polymer. Suitable isocyanates for use in the present invention are those of the aliphatic, araliphatic, cycloaliphatic, or aromatic series. Aliphatic monoisocyanates, containing alkyl groups having from 2 to about 20 carbon atoms are suitable, such as ethyl isocyanate, propyl isocyanate, butyl isocyanate, octadecyl isocyanate. They may be substituted by halogen or contain hetero atoms such as oxygen in the carbon chain, e.g., ω-chlorohexyl isocyanate, γ-ethoxypropylisocyanate. Suitable aliphatic diisocyanates are tetramethylene diisocyanate and hexamethylene diisocyanate. Cycloaliphatic monoisocyanates such as cyclohexyl isocyanate, cyclooctyl isocyanate are suitable. The ring may be substituted by alkyl or alkoxy groups, e.g. methoxy cyclohexyl isocyanate. Cyclohexane diisocyanate is representative of the suitable cycloaliphatic diisocyanates that may be used. Suitable aromatic monoisocyanates; which may be substituted in the ring by radicals such as halogen, nitro, alkyl, alkoxy, are phenyl isocyanate, totyl isocyanate, naphthyl isocyanate, p-chlorophenyl isocyanate, p-nitrophenyl isocyanate, p-methoxyphenyl isocyanate, and m-bromophenyl isocyanate. Among suitable aromatic diisocyanates, which may have the same or other substituents as the above monoisocyanates in the ring, are the following: toluene 2,4-diisocyanate, toluene 2,6-diisocyanate, 3,3'-dimethyl-4,4'-diphenylene diisocyanate, 1,5-naphthalene diisocyanate, p-p'-diphenylmethane diisocyanate, m-phenylene diisocyanate, p-phenylene diisocyanate, 1-methyl-3,5-diethyl benzene-2,4-diisocyanate, 1-methoxybenzene-2,4-diisocyanate, and 1-chlorobenzene-2,4-diisocyanate.

The aromatic isocyanates and diisocyanates are the preferred isocyanates for use in the present invention. A particularly preferred isocyanate is toluene 2,4-diisocyanate.

The reaction of my polyacetal copolymer with the isocyanate can be carried out in the same manner as described hereinbefore for the reaction with the acid anhydride, i.e., the isocyanate may serve as the suspending agent, or it may be dissolved in a common solvent for my polyacetal copolymer, viz—dimethyl formamide.

The amount of isocyanate used may vary over a wide range. Generally, a weight of isocyanate from about 1/20 to about 2 times the weight of polyacetal copolymer may be used. Preferably, a weight of about 1/10 to about 1.5 times the weight of copolymer should be used.

The isocyanation reaction may be carried out at a temperature of from about 50° to C. to about 200° C. Preferably, the temperature is between 120° C. to 190° C. The time required for the reaction may vary over wide limits, from as low as a few minutes to as long as a few minutes to as long as a week. The reaction may be conducted at atmospheric pressure or at above atmospheric. Also, an inherent atmosphere may be provided for carrying out the isocyanation reaction.

In another embodiment of the present invention a stable polyacetal copolymer is provided by reacting the terminal hydroxyl groups of my polyoxymethylene copolymer with an orthoester. Suitable orthoesters are trimethyl orthoformate, triethyl orthoformate, tripropyl orthoformate, tribuyl orthoformate, trimethyl orthoacetate, triethyl orthoacetate, tripropyl orthoacetate, tribuyl orhoacetate, trimethyl orthopropionate, triethyl orthopropionate, tripropyl orthopropionate, and tributyl orthopropionate. The reaction with an orthoester is preferably carried out in the presence of an acid catalyst. Preferred catalysts are boron trifluoride or phosphorous pentafluoride or their ether complexes, e.g., boron trifluoride dibutyl etherate, phosphorous pentafluoride diethyl etherate. These catalysts should be used in quantities ranging from about 0.001 percent to about 0.5 percent by weight of the amount of the orthoester used. The orthoester should be used in an amount between about 1/10 to about 10 times the weight of copolymer treated. The esterification with orthoester may be carried out under the same solvent, temperature, pressure, time and other conditions as set forth hereinbefore for esterification with an acid anhydride.

In another embodiment of the present invention a stable polyacetal copolymer is provided by reacting the terminal hydroxyl groups of my polyoxymethylene copolymer with a vinyl ether. Suitable classes of vinyl ethers are the vinyl alkyl ethers and the vinyl alkenyl ethers. Among the suitable ethers are vinyl methyl ether, vinyl ethyl ether, vinyl propyl ether, vinyl butyl ether, vinyl isobutyl ether, vinyl pentyl ether, vinyl hexyl ether, vinyl heptyl ether, vinyl octyl ether, vinyl-2-ethylhexyl ether, divinyl ether, vinyl propenyl ether, vinyl allyl ether, vinyl 1-butenyl ether, vinyl 2-butenyl ether, vinyl cyclobutyl ether and vinyl cyclohexyl ether. Generally, the alkyl and alkenyl radicals of the ethers should have from 1 to 8 carbon atoms and the cycloalkenyl radicals should have from 4 to 6 carbon atoms. Etherification with vinyl ethers may be carried out using the same quantity of reactants, the same catalysts, solvents, temperatures, pressures, times, etc. as used in end-capping the copolymer with an orthoester.

In still another embodiment of the present invention, a stable polyacetal copolymer is provided by reacting the terminal hydroxyl groups of my polyoxymethylene copolymer with an epoxide. Suitable epoxides are 1,2-propylene oxide, epichlorohydrin and 1,2-butylene oxide. A preferred epoxide is epichlorohydrin because of the ease with which it reacts with the copolymer and because of its low cost and ready availability. Etherification with epoxides may be carried out using the same quantity of reactants, catalysts, solvents, temperatures, pressures, times, etc. as used in end-capping the copolymer with an orthoester.

The processes by which these novel copolymers are produced will be further understood from the following examples. In all of these examples, all parts are by weight unless otherwise specified.

Example 1

To a solution of 5 grams norbornylene and 100 grams of s-trioxane in 100 grams cyclohexane was added 0.12 ml. BF$_3$-etherate. A slight reaction was obtained. After 37 minutes a second 0.12 ml. BF$_3$-etherate portion was added. The mixture solidified overnight at 70° C. The s-trioxane used as reactant was recrystallized from dichloromethane, using a 2/1 weight ratio of monomer to solvent. In general, the resulting polymer was processed as follows: breakdown by mortar and pestle, comminution in the presence of methanol and 2 gms. of tributyl amine, extraction of the unreacted monomer by refluxing under vacuum, again refluxing at the boiling point of methanol, adding 2 grams of tributyl amine for stabilization and filtering under vacuum with drying overnight at 60° C. Stability runs were made by heating unstabilized and stabilized samples at 222° C. for 1 and 2 hours and measuring weight loss.

Example 2

A copolymer of trioxane and norbornylene was prepared from 100 parts of trioxane and 0.8 part of norbornylene. 50.0 parts of trioxane was added initially to an 8 oz. bottle with 5.0 parts of cis-1,2-dichloroethylene, 0.07 part of 4-chlorophenyl diazonium hexafluorophosphate catalyst and the 0.8 part of norbornylene. The bottle was sealed and pressured to 15 lbs. with nitrogen and placed in a bath at 55° C. Two hours later another 50.0 parts of trioxane and 5.0 parts of cis-1,2-dichloroethylene were added to the reaction mixture. The reaction was allowed to continue for 20 hours. The copolymer product was slurried in boiling methanol for one hour and dried under vacuum at 55° C. for four hours. Yield of untreated copolymers after drying was 75.8 percent. The untreated copolymer had an inherent viscosity of 0.91 (measured at 0.2 percent weight in para-chlorophenol), a polymer melting temperautre of 172° C. and a crystalline melting point of 146° C.

The copolymer was treated by acetylating the hydroxyl end groups with acetic anhydride. 30 grams of the copolymer were placed in a flask with 600 ml. of dimethylformamide, 12 ml. of pyridine and 30 ml. of acetic anhydride. The copolymer was treated at the reflux temperature of dimethylformamide (144°–150° C.) for one hour. The treated copolymer was washed with distilled water, methanol, acetone, and dried for 4–6 hours at 55° C. in a vacuum. The treated copolymer retained 96.5 percent of its original weight, had an inherent viscosity of 1.59, a polymer melting temperature of 163° C., and a crystalline melting point of 146° C. The thermal stability of treated copolymer was determined at 222° C. by placing 1 g. of the copolymer in a ½-oz. narrow-neck, clear glass bottle covered with aluminum foil which was perforated with a 1 mm. diameter hole. The unstabilized treated copolymer retained 87.4 percent of its original weight after one hour and 63.8 percent after two hours. When stabilized with 5.0 parts of diphenylamine, the treated copolymer retained 93.0 percent of its original weight after one hour and 77.7 percent after two hours. The treated unstabilized copolymer had a tensile strength of 8,550 lb./sq. in., an elongation of 15.5 percent, and a tensile modulus of 288,000 lb./sq. in.

Example 3

A copolymer of trioxane and norbornylene was prepared according to the two-step procedure used in Example 2. The same proportions of reactants, catalyst, and diluent were used as in Example 2. After the copolymer product was slurried in boiling methanol and dried, a yield of 69.4 percent was obtained. The untreated copolymer had an inherent viscosity of 1.25, a polymer melting temperature of 170° C., and a crystalline melting point of 146° C.

A 30.0 g. portion of the copolymer was treated with acetic anhydride in the same manner as the copolymer in Example 2. This treated portion of the copolymer retained 85.7 percent of its original weight, had an inherent viscosity of 1.44, a polymer melting temperature of 163° C. and a crystalline melting point of 146° C.

A 35.0 g. portion of the copolymer was treated with a processing solution of 4.38 g. of toluene-2,4-diisocyanate in 175 g. of dimethylformamide at 144°–150° C. for a period of 60 minutes. This treated portion of the copolymer retained 84.3 percent of its original weight, had an inherent viscosity of 1.20, a polymer melting temperature of 162° C., and a crystalline melting point of 147° C.

The acetylated portion of the copolymer (unstabilized) had a weight retention of 92.4 percent after one hour and 69.2 percent after two hours. The acetylated copolymer when stabilized with 5.0 parts of diphenyl amine had a weight retention of 95.9 percent for one hour and 88.2 percent for two hours. An unstabilized portion of this copolymer had a tensile strength of 8,150 lb./sq. in., an elongation of 11.0 percent, and a tensile modulus of 270,000 lb./sq. in. A portion stabilized with 5.0 parts diphenyl amine had a tensile strength of 7,050 lb./sq. in., an elongation of 14.0 percent, and a tensile modulus of 193,000 lb./sq. in.

The portion of the copolymer treated with the diisocyanate (unstabilized) had a weight retention of 74.4 percent after one hour and 56.1 percent after two hours. The same copolymer after stabilization with 5.0 parts of diphenylamine had a weight retention of 88.1 percent after one hour and 81.0 percent after two hours. A 1 g. unstabilized plaque of this treated copolymer was found to retain 96.2 percent of its weight after treatment with 10 percent caustic for 5 hours. A diphenylamine stabilized portion of the isocyanate treated copolymer had a tensile strength of 7,300 lb./sq. in., an elongation of 17.0 percent, and a tensile modulus of 213,000 lb./sq. in.

Examples 4–21

Additional examples of the improved treated copolymers are set forth in the following tables:

TABLE I.—COPOLYMERIZATION OF TRIOXANE WITH NORBORNYLENE AND ACETYLATION OR ALKALINE PROCESSING OF THE COPOLYMER [a]

| Example | Norb.,[b] phr. | PF,[c] cc.[s] | Diluent[d] Type | Diluent[d] Amt., phr. | Reaction Time, hrs. | Conv., percent After Methanol [e] | Process Soln.[f] Type | Process Soln.[f] Retn., percent | PMT | Tm | $\eta_{inh}$ |
|---|---|---|---|---|---|---|---|---|---|---|---|
| | | | | | Copolymers of s-Trioxane and Norbornylene | | | | | | |
| 4 | 0.4 | 4 | TCE | 20 | 19.0 | 47.8 | Pyrrol / Acety | 62.5 / 91.6 | 160 / 161 | 149 / 149 | 1.65 / 1.85 |
| 5 | 0.4 | 6 | TCE | 20 | 17.5 | 69.9 | Acety | 94.4 | 162 | 152 | 2.28 |
| 6 | 0.4 | 6 | TCE | 20 | 18.5 | 63.8 | Pyrrol / Acety | 65.7 / 93.7 | 160 / 162 | 150 / 149 | 1.75 / 1.92 |
| 7 | 0.4 | 10 | TCE | 10 | 24.0 | 43.9 | Acety | 95.5 | 161 | 152 | 1.59 |
| 8 | 0.4 | 10 | TCE / EE | 10 / 2.8 | 17.8 | 73.8 | Acety | 93.3 | 160 | 152 | 1.52 |
| 9 | 0.6 | 6 | TCE | 10 | 0.7 | 48.8 | Acety | 96.0 | 160 | 150 | 1.24 |
| 10 | 0.6 | 6 | TCE | 10 | 19.0 | 71.7 | Acety | 94.5 | 161 | 151 | 1.56 |
| 11 | 0.6 | 6 | TCE | 20 | 1.0 | 39.8 | Acety | 87.5 | 159 | 150 | 0.95 |
| 12 | 0.6 | 6 | TCE | 20 | 17.0 | 55.7 | Acety | 96.5 | 159 | 151 | 1.50 |
| 13 | 0.6 | 6 | TCE | 20 | 16.5 | 57.8 | Acety | 95.0 | 161 | 150 | 1.80 |
| 14 | 0.6 | 8 | TCE | 20 | 16.5 | 73.7 | Acety | 91.8 | 161 | 151 | 1.68 |
| 15 | 0.6 | 10 | TCE / EE | 10 / 2.8 | 0.23 | 69.7 | Acety | 85.8 | 159 | 151 | 1.43 |
| 16 | 0.6 | 10 | TCE / EE | 10 / 2.8 | 18.8 | 69.8 | Acety | 88.6 | 159 | 151 | 1.37 |
| 17 | 0.6 | 10 | TCE | 20 | 1.4 | 55.8 | Acety | 94.6 | 161 | 152 | 1.69 |
| 18 | 0.6 | 10 | TCE | 40 | 4.0 | 42.8 | Acety | 95.4 | 161 | 150 | 1.33 |
| 19 | 0.6 | [g]10 | DCM | 50 | 41.0 | 27.8 | Acety | 85.7 | 163 | 151 | 0.26 |
| 20 | 0.6 | 10 | TCE | 80 | 69.0 | 41.8 | Acety | 95.4 | 167 | 150 | 0.91 |
| 21 | 0.6 | 10 | TCE | 120 | 19.0 | 15.3 | Acety | 88.9 | 161 | 151 | 0.73 |

[a] Polymerizations were conducted in 8-oz. bottles under a nitrogen pressure of 5 lb./sq. in. using 100 parts of trioxane at a temperature of 55° C.
[b] Norb.=Norbornylene.
[c] PF₅=Phosphorus pentafluoride.
[d] Diluents coded as follows: EE-ethyl ether; TCE-tetrachloroethylene and DCM-dichloromethane.
[e] Polymer was processed for one hour in refluxing methanol. Value is given for conversion after the polymer was processed in methanol.
[f] Polymer was processed for one hour in refluxing methanol and then in either a potassium hydroxide-N-methyl-2-pyrrolidone solution or it was acetylated. Retention values are given for the alkali and acetylation treatments. Inherent viscosity, polymer melting temperature and crystalline melting point are given for the polymers after the methanol and alkali treatments and after the methanol and acetylation treatments. Both methanol and acetylation treatments were conducted for 10 minutes at 150° C. Alkali treatment used 2.0 g. KOH in 300 ml. N-methyl-2-pyrrolidone. Acetylation used 600 ml. dimethylformamide, 30 ml. acetic anhydride, and 12 ml. pyridine. 30 g. polymer was used in both treatments.
[g] Added 10 cc. PF₅ at 17.5 hours.

TABLE II.—THERMAL STABILITY PROPERTIES OF COPOLYMERS OF TRIOXANE AND NORBORNYLENE OF TABLE I

| | Norb.,[1] p.h.r. | PF₅,[2] cc. | $\eta_{inh}$. | Process Solution[3] | Thermal Stability Properties at 222° C.[4] Wt. Retn. Percent | | | | | |
|---|---|---|---|---|---|---|---|---|---|---|
| | | | | | Unstabilized | | | Stabilized[5] | | |
| | | | | | 20 min. | 1 hr. | 2 hrs. | 1 hr. | 2 hrs. | 2 hrs.[6] |
| Copolymers of s-Trioxane and Norbornylene | | | | | | | | | | |
| Example: | | | | | | | | | | |
| 4 | 0.4 | 4 | 1.65 | Pyrrol | 99.6 | 85.2 | 70.7 | 94.9 | 88.7 | 78.2 |
| | | | 1.85 | Acety | 96.2 | 82.0 | 59.8 | 95.1 | 88.7 | 81.2 |
| 5 | 0.4 | 6 | 2.28 | Acety | 97.3 | 76.1 | 58.5 | 93.6 | 88.9 | 78.4 |
| 6 | 0.4 | 6 | 1.75 | Pyrrol | 98.3 | 84.6 | 63.4 | 96.7 | 89.6 | 74.9 |
| | | | 1.92 | Acety | 94.1 | 79.6 | 58.8 | 96.1 | 89.5 | 80.8 |
| 7 | 0.4 | 10 | 1.59 | Acety | 96.0 | 84.6 | 66.8 | 94.7 | 91.4 | 74.8 |
| 8 | 0.4 | 10 | 1.52 | Acety | 94.9 | 79.1 | 58.9 | 97.1 | 92.0 | 79.6 |
| 9 | 0.6 | 6 | 1.24 | Acety | 95.7 | 81.4 | 59.3 | 95.0 | 90.1 | 82.1 |
| 10 | 0.6 | 6 | 1.56 | Acety | 95.9 | 78.6 | 55.5 | 95.9 | 90.7 | 86.8 |
| 11 | 0.6 | 6 | 0.95 | Acety | 95.4 | 82.7 | 68.6 | 92.5 | 89.3 | 85.0 |
| 12 | 0.6 | 6 | 1.50 | Acety | 92.5 | 73.9 | 56.0 | 94.8 | 90.1 | ------ |
| 13 | 0.6 | 6 | 1.80 | Acrty | 95.7 | 80.4 | 58.3 | 97.2 | 90.8 | 82.7 |
| 14 | 0.6 | 8 | 1.68 | Acety | 94.1 | 77.0 | 53.5 | 90.0 | 85.9 | 74.1 |
| 15 | 0.6 | 10 | 1.43 | Acety | 80.5 | 70.1 | 50.4 | 92.8 | 87.4 | 79.0 |
| 16 | 0.6 | 10 | 1.37 | Acety | 94.8 | 80.4 | 62.4 | 95.8 | 90.8 | 79.4 |
| 17 | 0.6 | 10 | 1.69 | Acety | 93.6 | 78.6 | 56.7 | 96.5 | 90.8 | 78.0 |
| 18 | 0.6 | 10 | 1.33 | Acety | 93.3 | 78.7 | 69.5 | 94.3 | 89.3 | 83.6 |
| 19 | 0.6 | 20 | 0.26 | Acety | 76.4 | 24.6 | 2.8 | 47.3 | 33.7 | ------ |
| 20 | 0.6 | 10 | 0.91 | Acety | 94.6 | 79.4 | 61.3 | 92.0 | 85.4 | 78.6 |
| 21 | 0.6 | 10 | 0.73 | Acety | 89.4 | 47.8 | 13.9 | 81.7 | 70.5 | 73.3 |

[1] Norb., Norbornylene.
[2] PF₅, Phosphorus pentafluoride.
[3] A description of the processing solution is given in Table I footnotes. Pyrrol.=pyrrolidone-KOH treatment; Acety.=acetylation.
[4] Polymers were aged in ½-ounce, narrow neck clear glass bottles covered with aluminum foil which was perforated with one hole, approximately one mm. in diameter.
[5] Stabilized with 5 p.h.r. diphenylamine.
[6] Plaques were molded at 360° to 380° F. using stabilized powder and were aged in an open aluminum pan.

TABLE III.—TENSILE STRENGTH PROPERTIES OF COPOLYMERS OF TRIOXANE AND NORBORNYLENE

| | Norb., p.h.r. | Styrene, p.h.r. | PF₅, cc. | Process Solution | $\eta_{inh}$. | Tensile Strength, p.s.i. | El., percent | Tensile Modulus, p.s.i. |
|---|---|---|---|---|---|---|---|---|
| Copolymers of s-Trioxane and Norbornylene | | | | | | | | |
| Example: | | | | | | | | |
| 4 | 0.4 | ------ | 4 | Acety | 1.85 | 7,890 | 16.1 | 162,500 |
| 5 | 0.4 | ------ | 6 | Acety | 2.28 | 9,450 | 22.5 | 148,000 |
| 6 | 0.4 | ------ | 6 | Acety | 1.92 | 7,950 | 31.6 | 171,000 |
| 8 | 0.4 | ------ | 10 | Acety | 1.52 | 6,290 | 14.5 | 208,000 |
| 10 | 0.6 | ------ | 6 | Acety | 1.56 | 7,400 | 19.0 | 185,500 |
| 11 | 0.6 | ------ | 6 | Acety | 0.95 | 6,300 | 15.0 | 170,000 |
| 12 | 0.6 | ------ | 6 | Acety | 1.50 | 6,970 | 23.7 | 158,500 |
| 14 | 0.6 | ------ | 8 | Acety | 1.68 | 8,000 | 20.3 | 171,000 |
| 16 | 0.6 | ------ | 10 | Acety | 1.37 | 7,020 | 15.4 | 171,000 |

Example 26

A trioxane-norbornylene copolymer is prepared according to the procedure set forth in my copending application Serial No. 319,622, filed October 29, 1963. One portion of the untreated copolymer is treated with trimethyl orthoformate in the presence of phosphorus pentafluoride. The treated copolymer is found to have an increased thermal stability. Another portion is treated with vinyl methyl ether in the presence of phosphorus pentafluoride. The treated copolymer has an increased thermal stability. Still another portion of the copolymer is treated with epichlorohydrin in the presence of phosphorus pentafluoride. This treated copolymer also exhibits an increase in thermal stability compared to the original copolymer.

Example 27

A homopolymer made from trioxane was prepared and end-capped to provide a comparison of thermal stability between end-capped homopolymers and end-capped copolymers of the present invention. The polymerization procedure used was the same as in Example 2 except that no comonomer was used and 0.12 part of 4-chloro-phenyldiazonium hexafluorophosphate was used as the catalyst. Homopolymer yield was 99.2 percent. The homopolymer had an inherent viscosity of 1.29, a polymer melting temperature of 178° C. and a crystalline melting point of 149° C.

One portion of the homopolymer was acetylated as in Example 2. The end-capped homopolymer retained 92.3 percent of its original weight, had an inherent viscosity of 1.56, a polymer melting temperature of 174° C., and a crystalline melting point of 150° C. Another portion of the homopolymer was given the alkaline treatment as described in Example 2. The alkaline-treated copolymer retained only 28.6 percent of its original weight, had an inherent viscosity of 0.74, a polymer melting temperature of 171° C., and a crystalline melting point of 150° C.

The acetylated unstabilized homopolymer had a weight retention of 77.4 percent after one hour and 48.1 percent after two hours. A sample stabilized with 5.0 parts diphenylamine had a weight retention of 92.7 percent after one hour and 81.7 percent after two hours. The unstabilized alkaline-treated portion had a weight retention of 60.1 percent after one hour and 22.1 percent after two hours. A sample stabilized with 5.0 parts diphenylamine had a weight retention of 90.2 percent after one hour and 74.9 percent after two hours.

It can be readily seen by comparing the thermal stability of the end-capped trioxane homopolymer (both unstabilized and stabilized) with the end-capped copolymers of the present invention, generally have significantly higher thermal stabilities.

When conducting the end-capping reaction in suspension, the copolymer may be swollen by soaking in a liquid medium consisting of the liquid end-capping reagent itself or in an organic liquid which is a partial solvent for the copolymer. This pretreatment permits the end-capping liquid to react more readily with the hydroxyl end groups on the ends of the copolymer chains.

Examples 28 through 51

These provide a series for comparing results with various quantities of norbornylene using typical $BF_3$-dibutyl ether catalysts, such catalyst being selected from the various catalysts merely for convenience in the particular experimental set-up employed.

Example 28

Approximately 0.40 ml. of $BF_3$-dibutyl ether was added to a solution of 100 parts each of s-trioxane and cyclohexane with 0.5 part of norbornylene. The mixture solidified in 0.5 hour at a reaction temperature of 55° C. for a conversion percentage of 97.7, based on weight ratio of polymers formed relative to monomer charged. After the polymer was produced as described in connection with Example 1, the samples were heated at 222° C. for various times up to 2 hours and the weight loss observed.

Example 29

The procedure for Example 29 was substantially the same as that for Example 28 with a variation occuring in the amount of norbornylene added to the reaction mixture which in this instance was 1 part per 100 parts of s-trioxane.

Example 30

This was substantially the same as Example 28 except that 2.0 parts of norbornylene per 100 parts of s-trioxane was employed.

Example 31

This was substantially the same as Example 28 except that 0.60 ml. of $FB_3$-dibutyl ether catalyst was added and 2.0 parts norbornylene per 100 parts of s-trioxane were used.

Example 32

This was substantially the same as Example 31 except that 0.80 ml. of catalyst was employed.

Example 33

This was substantially the same as Example 31 except that 3.0 parts norbornylene was added per 100 parts s-trioxane.

Example 34

This was substantially the same as Example 28, but with 0.4 ml. catalyst and 3.0 parts of norbornylene per 100 parts of s-trioxane.

Example 35

This was substantially the same as Example 34 except that 4.0 parts norbornylene per 100 parts of s-trioxane were employed.

Example 36

This was substantially the same as Example 28, except that 0.60 ml. catalyst and 4.0 parts of norbornylene per 100 parts of s-trioxane were employed.

Example 37

This was substantially the same as Example 36 except that 0.80 ml. catalyst was employed.

Example 38

This was substantially the same as Example 28, except that 5.0 parts norbornylene per 100 parts of s-trioxane were employed.

Example 39

This was substantially the same as Example 38 except that 0.60 ml. of catalyst was employed.

Example 40

This was substantially the same as Example 38 except that 0.80 ml. catalyst was employed.

Example 41

This was substantially the same as Example 38 except that 1.00 ml. catalyst was employed.

Example 42

This was substantially the same as Example 38 except that 1.40 ml. catalyst was employed.

Example 43

This was substantially the same as Example 28 except that 0.80 ml. catalyst and 6.0 parts of norbornylene per 100 parts s-trioxane were employed.

Example 44

This was substantially the same as Example 43 except that 1.00 ml. of catalyst was employed.

Examples 45 and 46

This was substantially the same as Example 43 except that 1.40 ml. of catalyst was employed.

Example 47

This was substantially the same as Example 43 except that 2.00 ml. catalyst was used.

Example 48

This was substantially the same as Example 28 except that 0.80 ml. catalyst and 8.0 parts of norbornylene per 100 parts of s-trioxane were employed.

Example 49

This was substantially the same as Example 48 except that 1.00 ml. of catalyst was employed.

Example 50

This was substantially the same as Example 48 except that 2.00 ml. catalyst was employed.

Example 51

This was substantially the same as Example 28 except that 1.00 ml. catalyst and 10.0 parts norbornylene per 100 parts of s-trioxane were employed.

Examples 52–59

Examples 52 through 59 provide a series of comparisons for various quantities of diluents.

Example 52

Approximately 0.30 ml. of catalyst was added to 2.0 parts norbornylene and 100 parts each of s-trioxane and cyclohexane at 55° C.

Example 53

This was substantially the same as Example 52 except that 50 parts of cyclohexane were employed.

Example 54

This was substantially the same as Example 52 except that 30 parts of cyclohexane were employed.

Example 55

This was substantially the same as Example 52 except that 20 parts of cyclohexane were employed.

Example 56

This was substantially the same as Example 52 except that diluent was omitted.

Example 57 (Table V)

This was substantially the same as Example 52 except that 0.60 ml. catalyst, 100 parts of cyclohexane (diluent A) and 4.0 parts norbornylene per 100 parts of s-trioxane were employed.

Example 58

This was substantially the same as Example 57 except that 50 parts of cyclohexane (diluent A) were employed.

Example 59

This was substantially the same as Example 57 except that 30 parts of cyclohexane (diluent A) were employed.

Examples 60–72

Examples 60 through 72 provide a series of comparisons for various diluents.

Polymerizations of s-trioxane and norbornylene were conducted at 55° C. using $BF_3$-dibutyl ether catalyst and 14.8 to 31.9 parts of different diluents, cyclohexane (A), nitrobenzene (B), cis-1,2-dichloroethylene (C), diisobutyl ketone (D), benzaldehyde (E) and phenyl ether (F).

Examples 73–84

Polymerizations of s-trioxane and norbornylene were conducted at 55° C. for all except Examples 77–79 which were at different temperatures using a ferric chloride-propylene oxide complex, antimony trifluoride, and stannic chloride as catalysts and cyclohexane (A) and cis-1,2-dichloroethylene (C) as the diluents.

Additional variations were made in the processing procedures for removal of catalyst residues to improve the properties of the polymers. Variations in the polymer processing procedure follow.

For reactions catalyzed with different acidic catalysts the norbornylene was used as received and the cyclohexane (A) and cis-1,2-dichloroethylene (C) were distilled prior to use. The norbornylene was dissolved in the diluent and the solution and the s-trioxane were mixed at the reaction temperature prior to the addition of the catalyst.

As an illustration of acid treatment results, in a run with 0.08 ml. stannic chloride catalyst, 1.5 parts of norbornylene and 17.5 parts cis-1,2-dichloroethylene (C) as diluent (Example 75), the monomers reacted to 19.3 percent conversion and an inherent viscosity of 0.12 after treatment with dilute hydrochloric acid for 0.5 hour at 60° C. After 1 and 2 hours at 222° C., stabilized samples exhibited weight retention values of 86.7 and 62.4 percent, respectively. Apparently, the acid treatment removed the chloride residues and afforded polymers with improved thermal stability properties. Similar changes were noted for polymers catalyzed by a complex of ferric chloride and propylene oxide.

Example 60

Approximately 0.40 ml. $BF_3$-dibutyl ether in 4.8 parts (grams) cyclohexane (A) was added to 3.0 parts (grams) norbornylene, 10 parts (grams) cyclohexane and 100 parts (grams) cyclohexane and 100 parts (grams) s-trioxane at 55° C.

Example 61

Approximately 0.40 ml. $BF_3$-dibutyl ether in 4.8 parts nitrobenzene and 3.0 parts norbornylene in 7.2 parts nitrobenzene, was added to 10 parts nitrobenzene and 100 parts s-trioxane at 55° C.

Example 62

Approximately 0.26 ml. $BF_3$-dibutyl ether in 7.2 parts nitrobenzene and 2.0 parts norbornylene in 7.2 parts nitrobenzene were added to 10 parts nitrobenzene and 100 parts s-trioxane at 55° C.

Example 63

Approximately 0.30 ml. $BF_3$-dibutyl ether in 7.2 parts nitrobenzene and 3.0 parts norbornylene in 14.4 parts nitrobenzene were added to 10 parts nitrobenzene and 100 parts s-trioxane at 55° C. The resulting polymer had an inherent viscosity of 1.00 and had thermal stability properties comparable to those polymers made with cis-1,2-dichloroethylene. At similar levels of diluent, catalyst and comonomer, polymers made with the other diluents exhibited generally lower inherent viscosities and conversions, as well as lower weight retention values after two hours at 222° C.

Example 64

Approximately 0.60 ml. $BF_3$-dibutyl ether in 7.2 parts nitrobenzene and 6.0 parts norbornylene in 14.4 parts nitrobenzene were added to 10 parts nitrobenzene and 100 parts s-trioxane at 55° C.

Example 65

Approximately 0.40 ml $BF_3$-dibutylether in 2.5 parts cis-1,2-dichloroethylene and 3.0 parts norbornylene in 7.5 parts cis-1,2-dichloroethylene were added to 4.0 parts cis-1,2-dichloroethylene and 100 parts s-trioxane at 55° C.

Example 66

Approximately 0.30 ml. $BF_3$-dibutyl ether in 7.50 parts cis-1,2-dichloroethylene and 3.0 parts norbornylene in 7.50 parts cis-1,2-dichloroethylene were added to 10 parts cis-1,2-dichloroethylene and 100 parts 3-trioxane at 55° C.

Example 67

Approximately 0.60 ml. $BF_3$-dibutyl ether in 5.0 parts cis-1,2-dichloroethylene end 3.0 parts norbornylene in 7.5 parts cis-1,2-dichloroethylene were added to 10 parts cis-1,2-dichloroethylene and 100 parts s-trioxane at 55° C.

Example 68

Approximately 0.60 ml. $BF_3$-dibutyl ether in 5.0 parts cis-1,2-dichloroethylene and 3.0 parts norbornylene in 10.0 parts cis-1,2-dichloroethylene were added to 10 parts cis-1,2-dichloroethylene and 100 parts s-trioxane at 55° C.

Example 69

Approximately 0.60 ml. $BF_3$-dibutyl ether in 7.5 parts cis-1,2-dichloroethylene and 3.0 parts norbornylene in 10.0 parts cis-1,2-dichloroethylene were added to 10 parts cis-1,2-dichloroethylene and 100 parts s-trioxane at 55° C.

Example 70

Approximately 0.40 ml. $BF_3$-dibutyl ether in 4.84 parts diisobutyl ketone and 3.0 parts norbornylene in 6.45 parts diisobutyl ketone were added to 10 parts diisobutyl ketone and 100 parts s-trioxane at 55° C. After 17 hours added 0.2 ml. $BF_3$-dibutyl ether in 3.22 parts diisobutyl ketone.

Example 71

Approximately 0.40 ml. BF$_3$-dibutyl ether in 4.18 parts benzaldehyde and 3.0 parts norbornylene in 10.46 parts benzaldehyde were added to 10 parts benzaldehyde and 100 parts s-trioxane at 55° C.

Example 72

Approximately 0.40 ml. BF$_3$-dibutyl ether in 4.29 parts phenyl ether and 3.0 parts norbornylene in 8.58 parts phenyl ether were added to 10 parts phenyl ether and 100 parts s-trioxane at 55° C.

Example 73

Approximately 1.0 part propylene oxide was added to 1.0 part of ferric chloride in 20 ml. ether at room temperature. The slurry was added to 100 parts each of s-trioxane and cyclohexane and 1.5 parts norbornylene at 55° C. Polymer was refluxed 0.5 hour in methanol and 2.5 hours in ammonia solution. Polymer was light brown.

Example 74

Approximately 1.0 part propylene oxide was added to 1.0 part ferric chloride in 50 ml. ether at minus 30° C. The mixture was added to 1.5 part norbornylene and 100 parts each s-trioxane and cyclohexane at 55° C. Polymer was refluxed 0.5 hour in methanol, 0.3 hour in dilute acid (5 ml. HCl in approximately 700 ml. acetone) and washed with water. The polymer was off-white. The polymer was heated 2.5 hours reflux in 6 wt. percent ammonia solution, to afford a pale brown polymer.

Example 75

Approximately 1.0 part propylene oxide was added to 1.0 part ferric chloride in 50 cc. ether at room temperature. The mixture was added to 1.5 part norbornylene and 100 parts each s-trioxane and cyclohexane at 55° C. Polymer was refluxed 0.5 hour in methanol, twice for 0.3-hour each in dilute acid (5 ml. HCl in 700 ml. acetone) and washed once with water to give an off-white product. After 2.5 hours reflux in 6 wt. percent ammonia solution the polymer was pale brown.

Example 76

Approximately 1.0 part ferric chloride was added to 50 cc. ether and filtered. To the filtrate was added 1.2 parts propylene oxide at room temperature. The slurry was added to 1.5 part norbornylene and 100 parts each s-trioxane and cyclohexane at 55° C. Polymer was washed twice with methanol, refluxed in a solution of 5 ml. HCl and 700 ml. acetone, washed with water and given a 2-hour ammonia treatment.

Example 77

Approximately 4.0 parts antimony trifluoride were added to 1.5 parts norbornylene, 10 parts cyclohexane and 100 parts s-trioxane at 70° C. Polymer was refluxed for 24 hours in methanol with six grams of tributylamine and for 2.5 hours in ammonia solution.

Example 78

Approximately 4.0 parts antimony trifluoride were added to 10 parts cyclohexane, 1.5 parts norbornylene and 100 parts s-trioxane at 60° C. After 18 hours, temperature was raised to 85° C. Polymer was refluxed for 24 hours in methanol with six grams of tributylamine and for 2.5 hours in ammonia solution.

Example 79

Approximately 4.0 parts antimony trifluoride was added to 1.5 parts norbornylene, 10 parts cis-1,2-dichloroethylene and 100 parts s-trioxane at 70° C. Polymer was treated for 18 hours with methanol and dilute HCl, washed twice with water and refluxed 2.5 hours in ammonia solution.

Example 80

Approximately 0.16 ml. stannic chloride in 7.5 parts cyclohexane was added 1.5 parts s-trioxane at 55° C. Polymer was washed with methanol, treated for 17 hours with 700 ml. acetone and 2 ml. HCl, washed twice with water and refluxed 2.5 hours in ammonia solution.

Example 81

Approximately 0.12 ml. stannic chloride in 7.5 parts cyclohexane was added to 10 parts cyclohexane, 1.5 parts norbornylene and 100 parts s-trioxane at 55° C. Polymer was washed with methanol, treated for 17 hours with 700 ml. acetone and 2 ml. HCl, washed twice with water and refluxed 2.5 hours in ammonia solution.

Example 82

Approximately 0.12 ml. stannic chloride in 7.5 parts cis-1,2-dichloroethylene was added to 10 parts cis-1,2-dichloroethylene, 1.5 parts norbornylene and 100 parts s-trioxane at 55° C. Polymer was washed with methanol, refluxed 0.5 hour in 700 ml. acetone with 2 ml. HCl, washed twice with water and refluxed 2.5 hours in ammonia solution.

Example 83

Approximately 0.08 ml. stannic chloride in 7.5 parts cis-1,2-dichloroethylene was added to 10 parts cis-1,2-dichloroethylene, 1.5 parts norbornylene and 100 parts s-trioxane at 55° C. Polymer was processed by the method given for No. 82 except that the ammonia treatment was one hour.

Example 84

Approximately 0.12 ml. stannic chloride in 7.5 parts cis-1,2-dichloroethylene was added to 2.0 parts norbornylene, 10 parts cis-1,2-dichloroethylene and 100 parts s-trioxane at 55° C. Polymer was processed by the method given for No. 82 except that the ammonia treatment was one hour.

Example 85

This run was made with phosphorus pentafluoride catalyst.

Example 86

This run was made at 28° C.

Examples 87–89

These runs were made at 70° C.

Examples 90–97

These runs were made in bulk without diluent, and at 70° C.

Examples 98–103

These runs were made with nitrogen pressure of 15 pounds above atmospheric.

Formaldehyde polymerization

The basic experimental apparatus employed consisted of a pyrolysis flask, two cold traps, and a resin kettle equipped with a stirrer and dropping funnel. The pyrolysis flask was fitted with a nitrogen inlet and a delivery tube for the exit gas. Approximately 200 g. of paraformaldehyde was charged into the flask and heated with a heating mantle until at least 20 percent of the starting material was purged. Two cast iron U-tubes immersed in a −15° to −20° C. bath served as the cold traps. The resin kettle was charged with catalyst and diluent and equipped with a dropping funnel containing the norbornylene in a small amount of diluent. After the preliminary pyrolysis, the flask was jointed to the rest of the apparatus. Purified formaldehyde was then blown into the resin kettle while the solution was stirred vigorously and the norbornylene solution added slowly to the reactor. This process was continued until all the paraformaldehyde was pyrolyzed. The reaction was quenched with methanol and the polymer collected in a Buchner funnel.

Example 104

This example employed the basic formaldehyde polymerization apparatus and procedure set forth above, using cyclohexane as solvent, and with 5 grams of norbornylene; however, the methanol quench was preceded by an acetone wash to a clear filtrate, and followed by drying in vacuo for four hours at 55° C. The viscosity ($n_{inh}$) was measured at 0.2 percent by weight of polymer in parachlorophenol with 2 percent alpha-pinene. The polymer had low ash content, good thermal stability and very god molding properties.

Example 105

This example used the basic formaldehyde polymerization technique with $TiCl_4$-triethyl aluminum catalyst in 1500 ml. of decahydronaphthalene, and with 10 grams of norbornylene.

Example 106

This example employed the basic formaldehyde polymerization process with $TiCl_4$ and triethylaluminum in 1500 ml. decahydronaphthalene and with 10 grams of norbornylene. The polymer was additionally processed with slurrying in a 5 ml. HCl/1500 ml. butanol solution at room temperature for 24 hours, followed by washing with distilled water prior to the basic methanol quench treatment, which was followed by drying for four hours in vacuo at 55° C.

Example 107

The basic formaldehyde polymerization was followed, however, the norbornylene was purified by vacuum sublimation prior to use. The post treatment of the polymer included slurrying at room temperature for 24 hours in a 5 ml. HCl/1500 ml. iso-propanol solution, washing twice with methanol, drying in vacuo for 4 hours at 55° C. and refluxing with a 6 weight percent ammonia solution for one hour.

The conversion was high and the product exhibited good thermal stability properties. In addition its moldability was good.

A catalyst pre-preparation involved charging the reactor with the decahydronaphthalene, adding the $TiCl_4$, stirring for 10 minutes, adding the triethyl aluminum, stirring for another 10 minutes, then adding the norbornylene.

Example 108

The basic formaldehyde polymerization was followed, however the solvent decahydronaphthalene in the amount of 60 ml. was placed in a flask which had previously been cleaned and purged with dry nitrogen. The triethylaluminum was added and stirred for 5 minutes at 21° C. The titanium tetrachloride was added and the mixture stirred. This catalyst mixture was added to the reactor and the norbornylene added.

Post treatment of the polymer involved slurrying in a 5 ml. HCl/1500 ml. iso-propanol solution at room temperature for 24 hours, washing with methanol, drying for 4 hours at 55° C., in vacuum, and refluxing with a 6 weight percent ammonia solution for one hour.

Examples 109–110

Further runs providing excellent polymers.

TABLE IV

| Example | Norbornylene gr./100 s-Trioxane | Catalyst Type | Catalyst Amount | Diluent Type | Diluent Amount | Reaction Hrs. | Reaction °C. | Conv. Percentage |
|---|---|---|---|---|---|---|---|---|
| 1 | 5 | BF₃-Dibutyl Ether | 0.32 | Cyclohexane | 100 | 0.3 | 55 | 55 |
| 28 | 0.5 | do | 0.40 | do | 100 | 0.5 | 55 | 97.7 |
| 29 | 1.0 | do | 0.40 | do | 100 | 2.5 | 55 | 89.9 |
| 30 | 2.0 | do | | do | | | | |
| 31 | 2.0 | do | 0.60 | do | 100 | 20 | 55 | 92.1 |
| 32 | 2.0 | do | 0.80 | do | 100 | 2 | 55 | 66.7 |
| 33 | 3.0 | do | 0.60 | do | 100 | 19 | 55 | 30.0 |
| 34 | 3.0 | do | 0.40 | do | 100 | 48 | 55 | 32.5 |
| 35 | 4.0 | do | 0.40 | do | 100 | 48 | 55 | 31.0 |
| 36 | 4.0 | do | 0.60 | do | 100 | 48 | 55 | 51.0 |
| 37 | 4.0 | do | 0.80 | do | 100 | 19 | 55 | 57.9 |
| 38 | 5.0 | do | 0.40 | do | 100 | 24 | 55 | 62.0 |
| 39 | 5.0 | do | 0.60 | do | 100 | 19 | 55 | 35.3 |
| 40 | 5.0 | do | 0.80 | do | 100 | 19 | 55 | 43.7 |
| 41 | 5.0 | do | 1.00 | do | 100 | 19 | 55 | 59.2 |
| 42 | 5.0 | do | 1.40 | do | 100 | 96 | 55 | 77.0 |
| 43 | 6.0 | do | 0.80 | do | 100 | 19 | 55 | 46.8 |
| 44 | 6.0 | do | 1.00 | do | 100 | 48 | 55 | 56.7 |
| 45 | 6.0 | do | 1.40 | do | 100 | 36 | 55 | 67.6 |
| 46 | 6.0 | do | 1.40 | do | 100 | 19 | 55 | 67.6 |
| 47 | 6.0 | do | 2.00 | do | 100 | 19 | 55 | 77.4 |
| 48 | 8.0 | do | 0.80 | do | 100 | 19 | 55 | 35.3 |
| 49 | 8.0 | do | 1.00 | do | 100 | 19 | 55 | 35.0 |
| 50 | 8.0 | do | 2.00 | do | 100 | 36 | 55 | 79.7 |
| 51 | 10.0 | do | 1.00 | do | 100 | 24 | 55 | 24.9 |
| 52 | 2.0 | do | 0.30 | do | 100 | 18 | 55 | 45.5 |
| 53 | 2.0 | do | 0.30 | do | 50 | 18 | 55 | 50.0 |
| 54 | 2.0 | do | 0.30 | do | 30 | 18 | 55 | 49.0 |
| 55 | 2.0 | do | 0.30 | do | 20 | 18 | 55 | 77.5 |
| 56 | 2.0 | do | 0.30 | do | 0 | 1.0 | 60 | 98.7 |

TABLE IVA

| Example | PMT, °C. | $T_m$, °C | $\eta_{inh}$ | Wt. Retention, percent Unstabilized | | Wt. Retention, percent Stabilized | |
|---|---|---|---|---|---|---|---|
| | | | | 1 Hr. | 2 Hrs. | 1 Hr. | 2 Hrs. |
| 1 | 167 | 153 | 0.30 | 70.5 | 63.5 | 79.2 | 71.4 |
| 28 | 185 | 156 | 3.07 | 52.1 | 28.5 | 64.7 | 32.7 |
| 29 | 184 | 157 | 1.34 | 48.9 | 23.8 | 65.1 | 53.1 |
| 30 | 182 | 156 | 1.75 | 69.0 | 52.4 | 76.3 | 65.5 |
| 31 | 184 | 156 | 1.29 | 47.2 | 24.9 | 65.4 | 50.2 |
| 32 | 183 | 152 | 0.57 | 58.3 | 35.5 | 63.7 | 50.2 |
| 33 | 173 | 164 | 0.14 | 71.5 | 58.1 | 77.4 | 75.5 |
| 34 | 170 | 155 | 0.03 | 75.8 | 73.8 | 77.3 | 75.5 |
| 35 | 167 | 155 | 0.00 | 57.6 | 38.1 | 69.5 | 68.3 |
| 36 | 178 | 157 | 0.18 | 57.3 | 42.7 | 64.9 | 61.9 |
| 37 | 179 | 157 | 0.05 | 65.3 | 52.8 | 73.8 | 69.6 |
| 38 | 181 | 160 | 0.32 | 60.0 | 45.9 | 70.8 | 61.7 |
| 39 | 164 | 155 | 0.19 | 72.3 | 54.7 | 81.3 | 79.2 |
| 40 | 168 | 155 | 0.11 | 70.2 | 66.2 | 74.8 | 73.3 |
| 41 | 178 | 160 | 0.30 | 70.2 | 65.0 | 75.8 | 72.1 |
| 42 | 183 | 153 | 0.21 | 54.7 | 42.4 | 61.5 | 57.6 |
| 43 | 167 | 150 | 0.20 | 75.7 | 69.8 | 80.8 | 79.1 |
| 44 | 177 | 157 | 0.04 | 61.3 | 56.3 | 67.3 | 64.6 |
| 45 | 176 | 157 | 0.10 | 61.0 | 46.6 | 68.0 | 64.3 |
| 46 | 175 | 155 | 0.10 | 65.3 | 52.8 | 70.9 | 68.8 |
| 47 | 179 | 157 | 0.13 | 68.9 | 54.5 | 73.8 | 70.0 |
| 48 | 152 | 142 | 0.08 | 80.7 | 64.8 | 89.7 | 88.7 |
| 49 | 150 | 142 | 0.03 | 82.6 | 64.1 | 91.2 | 89.9 |
| 50 | 177 | 148 | 0.04 | 67.7 | 50.6 | 76.0 | 72.6 |
| 51 | 149 | 142 | 0.00 | 82.4 | 64.2 | 89.8 | 88.5 |
| 52 | 180 | 152 | 0.84 | 60.5 | 42.8 | 63.3 | 52.6 |
| 53 | 175 | 153 | 1.04 | 57.7 | 35.2 | 68.7 | 60.6 |
| 54 | 173 | 149 | 1.17 | 58.8 | 36.8 | 74.2 | 67.9 |
| 55 | 177 | 151 | 1.30 | 46.1 | 24.3 | 69.6 | 59.6 |
| 56 | 181 | 153 | 0.39 | 37.7 | 16.9 | 47.2 | 30.7 |

TABLE VA

| Example | PMT, °C. | $T_m$, °C | $\eta_{inh}$ | Wt. Retention, percent Unstabilized | | Wt. Retention, percent Stabilized | |
|---|---|---|---|---|---|---|---|
| | | | | 1 Hr. | 2 Hrs. | 1 Hr. | 2 Hrs. |
| 57 | 169 | 153 | 0.57 | 74.5 | 68.1 | 81.7 | 78.4 |
| 58 | 170 | 151 | 0.57 | 62.2 | 49.3 | 78.0 | 74.6 |
| 59 | 167 | 152 | 0.70 | 68.6 | 46.7 | 82.5 | 79.3 |
| 60 | 167 | 154 | 0.86 | 69.4 | 46.3 | 75.9 | 35.0 |
| 61 | 165 | 149 | 0.90 | 65.4 | 45.9 | 75.6 | 55.8 |
| 62 | 176 | 150 | 0.42 | 48.8 | 33.3 | 49.2 | 35.2 |
| 63 | 167 | 151 | 1.00 | 70.0 | 48.4 | 76.7 | 67.9 |
| 64 | 159 | 145 | 0.73 | 80.8 | 71.2 | 85.5 | 75.4 |
| 65 | 165 | 145 | 0.79 | 76.4 | 58.0 | 79.8 | 56.5 |
| 66 | 167 | 151 | 1.08 | 71.2 | 60.2 | 74.9 | 43.2 |
| 67 | 170 | 153 | 0.73 | 70.0 | 66.5 | 68.3 | 59.3 |
| 68 | 167 | 154 | 1.07 | 68.2 | 43.1 | 73.4 | 57.0 |
| 69 | 168 | 153 | 1.10 | 77.0 | 67.5 | 75.2 | 50.1 |
| 70 | 168 | 149 | 0.35 | 59.6 | 44.1 | 65.4 | |
| 71 | 162 | 146 | 0.50 | 66.4 | 56.0 | 63.0 | |
| 72 | 165 | 148 | 0.36 | 43.6 | 30.0 | 50.3 | |
| 73 | 170 | 151 | 0.29 | 13.7 | 0.7 | 30.4 | 14.4 |
| 74 | 170 | 150 | 0.21 | 48.8 | 28.6 | 44.4 | 29.7 |
| 75 | 170 | 150 | 0.20 | 22.0 | 1.1 | 52.3 | 40.0 |
| 76 | 163 | 151 | 0.20 | 1.4 | 0.7 | 52.7 | 40.9 |
| 77 | 171 | 142 | 0.65 | 29.3 | 3.8 | 63.3 | 15.7 |
| 78 | 160 | 150 | 0.34 | 33.9 | 6.8 | 80.6 | 25.6 |
| 79 | 174 | 152 | 0.48 | 12.2 | 4.0 | 39.5 | 21.9 |
| 80 | 172 | 150 | 0.45 | 64.1 | 40.5 | 56.2 | 43.8 |
| 81 | 175 | 151 | 0.35 | 28.6 | 16.8 | 42.4 | 18.1 |
| 82 | 165 | 143 | 0.22 | 8.2 | 2.1 | 76.1 | 54.4 |
| 83 | 161 | 142 | 0.12 | 50.5 | 5.8 | 86.7 | 62.4 |
| 84 | 169 | 148 | 0.36 | 68.5 | 48.2 | 65.4 | 51.1 |

TABLE V

| Example | Norbornylene gr./100 s-Trioxane | Catalyst Type | Catalyst Amount, ml./100 gms. s-Trioxane | Diluent Type | Diluent Amount, gms./100 gms. s-Trioxane | Reaction Time, Hours | Conversion Percent |
|---|---|---|---|---|---|---|---|
| 57 | 4.0 | BF₃-Dibutyl Ether | 0.60 | A | 100 | 23 | 36.0 |
| 58 | 4.0 | do | 0.60 | A | 50 | 17 | 45.2 |
| 59 | 4.0 | do | 0.60 | A | 30 | 18 | 42.6 |
| 60 | 3 | do | 0.4 | A | 14.8 | 17 | 48.9 |
| 61 | 3 | do | 0.4 | B | 22.0 | 17 | 79.7 |
| 62 | 2 | do | 0.26 | B | 24.4 | 17 | 96.8 |
| 63 | 3 | do | 0.30 | B | 31.6 | 48 | 85.5 |
| 64 | 6.0 | do | 0.60 | B | 31.6 | 17 | 79.3 |
| 65 | 3.0 | do | 0.40 | C | 14.0 | 48 | 46.0 |
| 66 | 3.0 | do | 0.30 | C | 25.0 | 4 | 81.8 |
| 67 | 3.0 | do | 0.60 | C | 22.5 | 2.0 | 78.7 |
| 68 | 3.0 | do | 0.60 | C | 25.0 | 3.7 | 80.5 |
| 69 | 3.0 | do | 0.60 | C | 27.5 | 2.0 | 83.6 |
| 70 | 3.0 | do | 0.60 | D | 24.5 | 48 | 23.3 |
| 71 | 3.0 | do | 0.40 | E | 24.6 | 72 | 46.7 |
| 72 | 3.0 | do | 0.40 | F | 18.6 | 17 | 53.5 |
| 73 | 1.5 | FeCl₃-PrO | 2.0 | A | 100 | 16 | 45.1 |
| 74 | 1.5 | do | 2.0 | A | 100 | 16 | 43.0 |
| 75 | 1.5 | do | 2.0 | A | 100 | 16 | 29.7 |
| 76 | 1.5 | do | 2.2 | A | 100 | 16 | 22.8 |
| 77 | 1.5 | SbF₃ | 4.0 | A | 10 | 16 | 54.9 |
| 78 | 1.5 | do | 4.0 | A | 10 | 48 | 21.3 |
| 79 | 1.5 | do | 4.0 | C | 10 | 17 | 62.3 |
| 80 | 1.5 | SnCl₄ | 0.16 | A | 17.5 | 0.17 | 59.0 |
| 81 | 1.5 | do | 0.12 | A | 17.5 | 0.17 | 74.2 |
| 82 | 1.5 | do | 0.12 | C | 17.5 | 0.50 | 31.2 |
| 83 | 1.5 | do | 0.08 | C | 17.5 | 17 | 19.3 |
| 84 | 2.0 | do | 0.12 | C | 17.5 | 16 | 63.7 |

TABLE VI

| Example | Norbornylene gr./100 s-Trioxane | Catalyst Type | Catalyst Amount | Catalyst Type | Catalyst Amount | Reaction Hrs. | Reaction °C. | Conv. Percentage |
|---|---|---|---|---|---|---|---|---|
| 85 | 2.0 | Phosphorus pentafluoride | 0.4 | A | 100 | 48 | 55 | 12 |
| 86 | 4.0 | BF₃-Dibutyl Ether | 0.3 | C | 100 | 72 | 28 | 77.5 |
| 87 | 2.0 | do | 0.2 | A | 100 | 19 | 70 | 49.3 |
| 88 | 2.0 | do | 0.4 | A | 100 | 19 | 70 | 68.7 |
| 89 | 2.0 | do | 0.4 | A | 100 | 19 | 70 | 61.9 |
| 90 | 3.0 | do | 0.3 | | | 21 | 70 | 74.5 |
| 91 | 5.0 | do | 0.4 | | | 23 | 70 | 52.8 |
| 92 | 5.0 | do | 0.3 | | | 17 | 70 | 71.0 |
| 93 | 3.0 | do | 0.4 | | | 1.2 | 70 | 74.8 |
| 94 | 3.0 | do | 0.4 | | | 17 | 90 | 75.0 |
| 95 | 5.0 | do | 0.2 | | | 17 | 90 | 57.5 |
| 96 | 5.0 | do | 0.2 | | | 18 | 90 | 73.5 |
| 97 | 6.0 | do | 0.4 | | | 2.7 | 90 | 68.7 |
| 98 | 6.0 | do | 0.40 | A | 100 | 18 | 55 | 50 |
| 99 | 2.0 | do | 0.60 | A | 100 | 18 | 55 | 53.3 |
| 100 | 3.0 | do | 0.60 | A | 100 | 18 | 55 | 35.7 |
| 101 | 4.0 | do | 0.80 | A | 100 | 18 | 55 | 49.4 |
| 102 | 5.0 | do | 1.00 | A | 100 | 18 | 55 | 64.0 |
| 103 | 6.0 | do | 0.80 | A | 100 | 18 | 55 | 49.1 |

NOTE.—A=Cyclohexane; C=Cis-1-2-dichloroethylene.

TABLE VIA

| Example | PMT, °C. | $T_m$, °C. | $\eta_{inh}$ | Wt. Retention, Percent Unstabilized | | Wt. Retention, Percent Stabilized | |
|---|---|---|---|---|---|---|---|
| | | | | 1 Hr. | 2 Hrs. | 1 Hr. | 2 Hrs. |
| 85 | 180 | 150 | 0.71 | 27.8 | 4.5 | 22.9 | 8.8 |
| 86 | 173 | 154 | 0.03 | 36.2 | 27.1 | 40.0 | 36.1 |
| 87 | 178 | 150 | 0.10 | 44.8 | 29.8 | 51.8 | 46.2 |
| 88 | 180 | 149 | 0.59 | 54.1 | 33.5 | 59.1 | 50.2 |
| 89 | 177 | 149 | 0.25 | 55.5 | 35.3 | 61.2 | 57.2 |
| 90 | 175 | 154 | 0.43 | 53.5 | 38.0 | 65.9 | 61.1 |
| 91 | 175 | 151 | 0.35 | 72.5 | 62.9 | 77.5 | 76.8 |
| 92 | 180 | 155 | 0.20 | 56.9 | 43.9 | 57.4 | 50.4 |
| 93 | 180 | 155 | 0.24 | 48.1 | 33.8 | 62.4 | 58.2 |
| 94 | 175 | 153 | 0.30 | 68.5 | 47.3 | 72.9 | 69.5 |
| 95 | 165 | 154 | 0.45 | 71.7 | 66.9 | 77.2 | 76.8 |
| 96 | 174 | 156 | 0.34 | 58.3 | 39.3 | 68.5 | 65.3 |
| 97 | 162 | 154 | 0.33 | 75.4 | 54.0 | 85.0 | 83.5 |
| 98 | 173 | 151 | 0.91 | 65.6 | 46.8 | 67.0 | 23.4 |
| 99 | 176 | 153 | 0.97 | 66.7 | 58.2 | 66.0 | |
| 100 | 164 | 149 | 0.70 | 80.3 | 70.0 | 83.7 | 78.2 |
| 101 | 176 | 154 | 0.83 | 64.9 | 46.7 | 68.8 | 52.5 |
| 102 | 175 | 149 | 0.66 | 69.0 | 61.0 | 72.1 | |
| 103 | 170 | 151 | 0.69 | 77.2 | 76.7 | 78.4 | 71.2 |

TABLE VII

| | Norbornylene gr. 100 s-Trioxane | Catalyst | | Diluent | | Reaction | | HCHO, gr. | Conv. Percentage |
|---|---|---|---|---|---|---|---|---|---|
| | | TiCl, mols | $Et_3Al$, mols | Type | Amount | Hrs. | °C. | | |
| Example: | | | | | | | | | |
| 104 | 5.0 | 3 | 9 | A | 750 | 4.5 | 20 | 214.2 | 28.6 |
| 105 | 10.0 | 3 | 9 | G | 1,500 | 20.8 | 20 | 184.7 | 18.8 |
| 106 | 10.0 | 3 | 9 | G | 1,500 | 23.2 | 20 | 230.3 | 19.2 |
| 107 | 10.0 | 3 | 9 | G | 1,500 | 20.7 | 20 | 325.5 | 68.2 |
| 108 | 10.0 | 3 | 9 | G | 1,500 | 21.3 | 20 | 224.7 | 41.6 |
| 109 | 10.0 | 3 | 9 | G | 750 | 21.0 | 20 | 189.9 | 28.5 |
| 110 | 10.0 | 3 | 9 | G | 1,500 | 19.6 | 20 | 192.6 | 27.4 |

TABLE VIIA

| | PMT, °C. | $T_m$, °C. | $\eta_{inh}$ | Unstabilized | | Stabilized | |
|---|---|---|---|---|---|---|---|
| | | | | 1 Hr. | 2 Hrs. | 1 Hr. | 2 Hrs. |
| Example: | | | | | | | |
| 104 | 176 | 148 | 2.82 | 54.0 | 71.9 | | 29.4 |
| 105 | 174 | 148 | 3.63 | 75.2 | 51.0 | 95.0 | 84.5 |
| 106 | 172 | 148 | 1.58 | 22.8 | 8.9 | 64.9 | 56.6 |
| 107 | 176 | 151 | 2.94 | 64.9 | 41.0 | 79.0 | 65.5 |
| 108 | 178 | 150 | 1.84 | 24.6 | 2.0 | 58.6 | 45.0 |
| 109 | 177 | 146 | 3.68 | 73.0 | 52.5 | 80.9 | 74.7 |
| 110 | 179 | 149 | 3.49 | 88.9 | 76.9 | 77.8 | 59.6 |

NOTE.—A = Cyclohexane; G = Decahydronaphthalene.

In addition to the organic acid anhydrides set forth hereinbefore, the anhydrides of the diacids such as malonic, succinic, glutaric, phthalic, and pyromellitic are also suitable for use as acylating agents. A significant advantage of the present invention is the provision of a very stable polyacetal copolymer having a high molecular weight at a very high yield as compared to polyacetals prepared heretofore.

The polyacetal copolymers of the present invention may be used to prepare molded or extruded shapes, articles, fibers, filaments, films, sheets, rods, tubes, pipes, and other articles. Thus these copolymers may be put to all the uses known for commercial polyacetal resins such as those set forth in "Acetal Resins," Russell B. Akin, Reinhold Publishing Corporation, New York, 1962, pp. 169–174. The copolymers may be modified for particular use by the addition of antioxidants, fillers, pigments, and the like.

I claim:
1. A high molecular weight, high melting oxymethylene interpolymer of (a) a major amount of a formaldehyde and (b) norbornylene, the amount of said norbornylene chemically combined in said interpolymer ranging from about 0.1 mole percent to about 20 mole percent of the interpolymer, said interpolymer having an inherent viscosity of from about 0.5 to about 3.0, said interpolymer being further characterized in having recurring oxymethylene moieties interspersed with norbornylene moieties.

2. The composition of claim 1 wherein said norbornylene is chemically combined in said interpolymer in an amount ranging from about 1 to about 15 mole percent of the interpolymer.

3. The combination of claim 1 wherein said norbornylene is chemically combined with said interpolymer in an amount ranging from about 2 to about 5 mole percent of the interpolymer.

4. A process for preparing an oxymethylene interpolymer as claimed in claim 1 comprising copolymerizing under essentially anhydrous conditions s-trioxane and norbornylene in the presence of a Lewis acid catalyst, said norbornylene being employed in an amount ranging from about 0.1 mole percent to about 20 mole percent of said s-trioxane.

5. A process for preparing an oxymethylene interpolymer as claimed in claim 1 comprising copolymerizing under essentially anhydrous conditions gaseous monomeric formaldehyde and norbornylene in the presence of a Lewis base catalyst, said norbornylene being employed in an amount ranging from about 0.1 to about 20 mole percent of said formaldehyde.

6. A process for preparing an oxymethylene interpolymer as claimed in claim 1 comprising copolymerizing under essentially anhydrous conditions in the presence of a diluent trioxane and norbornylene in the presence of a boron trifluoride etherate catalyst, said norbornylene being employed in an amount from about 0.1 mol percent to about 20 mol percent of said formaldehyde.

7. A process for preparing an oxymethylene interpolymer as claimed in claim 1 comprising copolymerizing under essentially anhydrous conditions gaseous monomeric formaldehyde and norbornylene in the presence of a 1 to 3 mol mixture of titanium tetrachloride and triethyl aluminum catalyst, said norbornylene being employed in an amount ranging from about 1 to about 6 mol percent of said formaldehyde.

8. A process of treating an interpolymer of a formaldehyde and norbornylene comprising contacting the interpolymer with a dilute hydrochloride acid-alcohol solution, and thereafter washing the interpolymer with an alcohol.

9. A process for preparing an oxymethylene interpolymer as claimed in claim 1 comprising copolymerizing under essentially anhydrous conditions in the presence of a diluent trioxane and norbornylene in the presence of a tin tetrachloride catalyst, said norbornylene being employed in an amount of about 0.1 mol percent to about 20 mol percent of said formaldehyde; and thereafter treating said polymer to substantially remove catalyst residues.

10. A process for preparing an oxymethylene interpolymer as claimed in claim 1 comprising copolymerizing under essentially anhydrous conditions in the presence of an inert diluent trioxane and norbornylene in the presence of an antimony tetrachloride catalyst, said norbornylene being employed in an amount of about 0.1 mol percent to about 20 mol percent of said formaldehyde; and thereafter treating said polymer to substantially remove catalyst residues.

11. The process of claim 4 wherein there is copolymerized under essentially anhydrous conditions 100 parts of trioxane and from about 1 to about 6 parts of norbornylene in the presence of a boron trifluoride etherate catalyst at a temperature of about 30 to about 90° C. in the presence of an inert hydrocarbon diluent.

12. The process of claim 11 wherein the temperature is at least about 55° C.

13. The process of claim 11 wherein said diluent is cyclohexane.

14. The process of claim 11 further characterized in that it is conducted in nitrobenzene as a diluent.

15. A process for preparing an oxymethylene interpolymer comprising copolymerizing under essentially anhydrous conditions gaseous monomeric formaldehyde and norbornylene in the presence of a titanium tetrachloride and triethyl aluminum catalyst at a temperature of at least about 20° C. in a decahydronaphthalene diluent.

16. A stabilized, heat resistant oxymethylene interpolymer prepared by reacting the terminal hydroxyl groups of the interpolymer of claim 1 with a material selected from the group consisting of: an organic acid anhydride; an etherification agent selected from the group consisting of orthoesters, vinyl ethers, and epoxides; and an isocyanate selected from the group consisting of aliphatic and cyclic isocyanates.

17. A stabilized, heat resistant oxymethylene interpolymer prepared by reacting the terminal hydroxyl groups of the interpolymer of claim 1 with an etherification agent selected from the group consisting of orthoesters, vinyl ethers, and epoxides.

18. A stabilized, heat resistant oxymethylene interpolymer prepared by reacting the terminal hydroxyl groups of the interpolymer of claim 1 with an isocyanate selected from the group consisting of aliphatic and cyclic isocyanates.

19. The copolymer of claim 16 wherein the organic acid anhydride is acetic anhydride.

20. The copolymer of claim 16 wherein the cyclic isocyanate is toluene-2,4-diisocyanate.

21. A process for the production of a stabilized, heat resistant oxymethylene interpolymer which comprises reacting the terminal hydroxyl groups of the interpolymer of claim 1 with an organic acid anhydride, said anhydride being present in an amount equal to from about one-half the weight of the interpolymer treated to about 40 times the weight of the interpolymer treated, the reaction being conducted at a temperature from about 50° C. to about 200° C. in the presence of a catalyst.

22. A process for the production of a stabilized, heat resistant oxymethylene interpolymer which comprises reacting the terminal hydroxyl groups of the interpolymer of claim 1 with an etherification agent selected from the group consisting of orthoesters, vinyl ethers, and epoxides, said etherification agent being present in an amount equal to from about one-half the weight of the interpolymer treated to about 40 times the weight of the interpolymer treated, the reaction being conducted at a temperature from about 50° C. to about 200° C. in the presence of a catalyst.

23. A process for the production of a stabilized, heat resistant oxymethylene interpolymer which comprises reacting the terminal hydroxyl groups of the interpolymer of claim 1 with an isocyanate selected from the group consisting of aliphatic and cyclic isocyanates, said isocyanates being present in an amount equal to from about one-half the weight of the interpolymer treated to about 40 times the weight of the interpolymer treated, the reaction being conducted at a temperature from about 50° C. to about 200° C. in the presence of a catalyst.

24. A process for increasing the stability of the interpolymer of claim 1 which comprises reacting said interpolymer with an acid anhydride in the presence of an amine catalyst at a temperature of from about 50° C. to about 200° C.

25. A process for the production of a stabilized, heat resistant oxymethylene interpolymer which comprises reacting the terminal hydroxyl groups of the interpolymer of claim 1 with a material selected from the group consisting of: an organic acid anhydride; an etherification agent selected from the group consisting of orthoesters, vinyl ethers, and epoxides; and an isocyanate selected from the group consisting of aliphatic and cyclic isocyanates.

26. The process set forth in claim 25 wherein said interpolymer is suspended in a liquid medium and the reaction is carried out in suspension.

References Cited

UNITED STATES PATENTS 3,344,120   9/1967   Rosen _____ 260—73

OTHER REFERENCES

Furukawa et al., Polymerization of Aldehydes and Oxides, Polymer Reviews, vol. 3, Interscience Publishers, New York (1963), p. 401.

F. D. ANDERSON, *Primary Examiner.*

L. M. PHYNES, *Assistant Examiner.*

U.S. Cl. X.R.

260—73, 874, 77.5, 47